United States Patent
Whalen

(10) Patent No.: US 9,241,505 B2
(45) Date of Patent: Jan. 26, 2016

(54) METHOD OF PREPARING AN OAT PROTEIN AND FIBER PRODUCT

(71) Applicant: Oat Tech Inc., Rapid City, SD (US)

(72) Inventor: Paul Whalen, Rapid City, SD (US)

(73) Assignee: OAT TECH INCORPORATED, Rapid City, SD (US)

( * ) Notice: Subject to any disclaimer, the term of this patent is extended or adjusted under 35 U.S.C. 154(b) by 0 days.

(21) Appl. No.: 13/744,325

(22) Filed: Jan. 17, 2013

(65) Prior Publication Data

US 2013/0183404 A1    Jul. 18, 2013

Related U.S. Application Data

(60) Provisional application No. 61/587,242, filed on Jan. 17, 2012.

(51) Int. Cl.
| | |
|---|---|
| *A23L 1/105* | (2006.01) |
| *A23L 1/305* | (2006.01) |
| *A23J 1/12* | (2006.01) |

(52) U.S. Cl.
CPC ............... *A23L 1/1055* (2013.01); *A23J 1/125* (2013.01); *A23L 1/3055* (2013.01)

(58) Field of Classification Search
CPC ... A23L 1/1055; A23L 1/3053; A23L 1/3055; A23L 1/09; A23L 1/1016; A23L 1/10; A23L 1/185; A23L 2/60; A23L 1/095; A21D 2/265; C08L 3/02
USPC ...................................... 426/18, 28, 622, 618
See application file for complete search history.

(56) References Cited

U.S. PATENT DOCUMENTS

| | | | |
|---|---|---|---|
| 4,069,103 A | 1/1978 | Muller | |
| 4,435,429 A * | 3/1984 | Burrows et al. | 426/18 |
| 4,744,992 A | 5/1988 | Mitchell et al. | |
| 4,857,339 A | 8/1989 | Maselli et al. | |
| 4,996,063 A | 2/1991 | Inglett | |
| 5,082,673 A | 1/1992 | Inglett | |
| 5,723,162 A | 3/1998 | Whalen et al. | |
| 5,989,598 A | 11/1999 | Whalen et al. | |
| 6,261,629 B1 * | 7/2001 | Mazza et al. | 426/656 |
| 6,395,314 B1 | 5/2002 | Whalen et al. | |
| 6,589,589 B2 | 7/2003 | Whalen | |
| 6,685,974 B2 | 2/2004 | Whalen | |
| 7,709,033 B2 | 5/2010 | Kvist et al. | |
| 7,858,139 B2 | 12/2010 | Kvist et al. | |
| 7,910,143 B2 | 3/2011 | Kvist et al. | |
| 2002/0018830 A1 | 2/2002 | Whalen | |
| 2005/0136162 A1 | 6/2005 | Kvist et al. | |
| 2007/0148267 A1 * | 6/2007 | Komarnytskyy et al. | 424/773 |
| 2009/0259018 A1 * | 10/2009 | Barrows et al. | 530/300 |

* cited by examiner

*Primary Examiner* — Hamid R Badr
(74) *Attorney, Agent, or Firm* — Moss & Barnett

(57) ABSTRACT

A method of preparing an oat protein and fiber product. A base formulation is mixed water to form a slurry. The base formulation has a major amount of an oat material or waxy barley hybrid. At least one enzyme is mixed into the slurry. The at least one enzyme capable of facilitating sugar formation and thinning of the slurry. The slurry is cooked to convert the slurry into a first intermediate product having a DE of between about 20 and 90. The first intermediate product is diluted with water to form a second intermediate product. The second intermediate product is heated. A first solids slurry is recovered from the second intermediate product using a clarifying centrifuge. The first solids slurry is dried to form a dried product.

17 Claims, 2 Drawing Sheets

|  | Sample 1 (%) | | Sample 2 (%) | | Sample 3 (%) | | Sample 4 (%) | | Average | |
| --- | --- | --- | --- | --- | --- | --- | --- | --- | --- | --- |
|  | as is | 100% protein | as is | 100% protein | as is | 100% protein | as is | 100% protein | as is | 100% protein |
| Alanine | 2.36 | 4.53 | 2.14 | 3.93 | 2.11 | 3.71 | 2.28 | 3.94 | 2.22 | 4.03 |
| Arginine | 3.61 | 6.93 | 3.65 | 6.71 | 3.61 | 6.36 | 4.12 | 7.13 | 3.75 | 6.78 |
| Aspartic Acid | 3.03 | 5.82 | 3.93 | 7.22 | 3.75 | 6.60 | 3.97 | 6.87 | 3.67 | 6.63 |
| Cystine | 1.43 | 2.74 | 1.43 | 2.63 | 1.43 | 2.52 | 1.53 | 2.65 | 1.46 | 2.63 |
| Glutamic Acid | 10.3 | 19.77 | 11.2 | 20.59 | 11.8 | 20.77 | 11.9 | 20.59 | 11.30 | 20.43 |
| Glycine | 2.24 | 4.30 | 2.49 | 4.58 | 2.51 | 4.42 | 2.48 | 4.29 | 2.43 | 4.40 |
| Histidine | 1.15 | 2.21 | 1.32 | 2.43 | 1.59 | 2.80 | 1.46 | 2.53 | 1.38 | 2.49 |
| Isoleucine | 2.29 | 4.40 | 2.08 | 3.82 | 2.07 | 3.64 | 2.41 | 4.17 | 2.21 | 4.01 |
| Leucine | 4.27 | 8.20 | 4.26 | 7.83 | 4.29 | 7.55 | 4.46 | 4.46 | 3.85 | 7.01 |
| Total Lysine | 2.03 | 3.90 | 2.1 | 3.86 | 2.05 | 3.61 | 2.06 | 3.56 | 2.06 | 3.73 |
| Methionine | 1.03 | 1.98 | 0.91 | 1.67 | 0.87 | 1.53 | 0.96 | 1.66 | 0.94 | 1.71 |
| Phenylalanine | 2.82 | 5.41 | 2.84 | 5.22 | 3.01 | 5.30 | 2.75 | 4.76 | 2.86 | 5.17 |
| Proline | 3.24 | 6.22 | 3.34 | 6.14 | 3.18 | 5.60 | 3.44 | 5.95 | 3.30 | 5.98 |
| Tryptophan | 0.65 | 1.25 | 0.51 | 0.94 | 0.55 | 0.97 | 0.68 | 1.18 | 0.60 | 1.08 |
| Serine | 2.77 | 5.32 | 2.81 | 5.17 | 2.74 | 4.82 | 2.88 | 4.98 | 2.80 | 5.07 |

Fig. 1

|  | Sample 1 (%) | | Sample 2 (%) | | Sample 3 (%) | | Sample 4 (%) | | Average | |
| --- | --- | --- | --- | --- | --- | --- | --- | --- | --- | --- |
|  | as is | 100% protein | as is | 100% protein | as is | 100% protein | as is | 100% protein | as is | 100% protein |
| Threonine | 2.49 | 4.78 | 2.05 | 3.77 | 1.96 | 3.45 | 2.13 | 3.69 | 2.16 | 3.92 |
| Tyrosine | 1.93 | 3.70 | 2.17 | 3.99 | 2.05 | 3.61 | 2.09 | 3.62 | 2.06 | 3.73 |
| Valine | 2.2 | 4.22 | 2.04 | 3.75 | 1.99 | 3.50 | 2.25 | 3.89 | 2.12 | 3.84 |
| Fructose | 0.6 |  | 0.5 |  | n.d. |  | n.d. |  |  |  |
| Glucose | 12 |  | 16.5 |  | 15.2 |  | 11.4 |  |  |  |
| Maltose | 9.7 |  | 7.7 |  | 6.8 |  | 8 |  |  |  |
| Sucrose | 0.4 |  | 0.2 |  | 0.3 |  | 0.3 |  |  |  |
| Fat | 5.5 |  | 15.9 |  | 11.7 |  | 14.6 |  |  |  |
| Ash | 1.3 |  | 2.36 |  | 1.6 |  | 2.45 |  |  |  |
| Protein | 52.1 |  | 54.4 |  | 56.8 |  | 57.8 |  |  |  |
| Moisture | 3.6 |  | 2.6 |  | 4 |  | 4.3 |  |  |  |
| TDF |  |  | 4.3 |  | 4.1 |  | 3.9 |  |  |  |

Fig. 1 (continued)

METHOD OF PREPARING AN OAT PROTEIN AND FIBER PRODUCT

This application claims priority to U.S. Provisional Application No. 61/587,242, filed Jan. 17, 2012. The contents of which are incorporated herein by reference.

FIELD OF THE INVENTION

The invention relates generally to an oat-derived food product. More particularly, the invention relates to a method of preparing an oat protein and fiber product.

BACKGROUND OF THE INVENTION

Consumers are increasingly concerned about purchasing and consuming products that the consumers view as being more healthful. For example, products possessing higher levels of complex carbohydrates and fiber, especially soluble fiber, are becoming more popular with consumers.

In addition, products containing lower levels of fat and cholesterol as well as a decreased caloric content are becoming more popular with consumers. Many consumers also desire products made from all-natural components that contain no stabilizers, emulsifiers, or other exogenous additives, such as refined sugars or artificial sweeteners.

One drawback of food products produced for the health conscious market is that they tend to be less sweet than conventional food products. One technique that has been used to overcome this drawback and thereby make such food products appeal to a greater portion of society is to add sweeteners, such as sucrose, glucose syrup, and high fructose corn syrup.

Even though the addition of the sweeteners increases the appeal of the food products to some segments of the health conscious market, these products are not desired by consumers who exclude refined or artificial sweeteners from their diet.

An article by Janet Raloff (Beyond Oat Bran, Food Technology 1991 vol. 8, page 62) describes the physiological benefits of consuming an oat-based product, which is identified by the name Oatrim. The oat-based product is formulated from either oat bran or oat flour. The article indicates that the odorless and nearly tasteless oat-based product is particularly suited as a fat replacement in low-temperature applications, such as frozen confections.

Oat-based food products are described in Inglett, U.S. Pat. Nos. 4,996,063 and 5,082,673. A mixture of oats and water is gelatinized by passage through a steam injection cooker at a temperature of between 138° C. and 143° C. After the pH of the mixture is adjusted, alpha-amylase is added to hydrolyze the starch in the mixture.

Once hydrolyzation is complete, soluble fiber is separated from the mixture. Finally, the soluble fiber is dehydrated to provide the oat-based food product. Examples in the Inglett patents indicate that the oat-based food product is mixed with additional components, such as milk and sugar, to formulate the frozen confection.

Mitchell et al., U.S. Pat. No. 4,744,992, discloses using a dual enzyme method, which includes liquefying and saccharifying rice, to produce a high glucose syrup. Examples in the Mitchell et al. patent indicate that when the syrup is incorporated into a frozen confection, vegetable oil in a concentration of approximately 10 weight percent of the frozen confection as well as stabilizers are added to provide the frozen confection with a creamy texture. Mitchell et al. also indicates that liquefaction is performed at a temperature of approximately 80° C.

Whalen et al., U.S. Pat. Nos. 6,685,974; 6,589,589; 6,395,314; 5,989,598 and 5,723,162, each describe a process for preparing an oat-based functional syrup and then forming an oat-based frozen confection from the oat-based functional syrup. The contents of the preceding patents are expressly incorporated herein by reference.

In addition to the fact that oats have a relatively high protein concentration of about 11 weight percent, the oat protein has the highest nutritive value of the commonly cultivated cereal grains such as corn (maize), wheat and rice.

For an ingredient to have commercial value for use in supplement formulations by adding significant amounts of protein such as between about 1 and 3 grams and optimally more per serving at common serving sizes such as between about 30 and 55 grams for cereal products and between about 240 and 320 grams for beverage products, the ingredient product would have to contain a substantial protein concentration.

Even though oats have a high protein concentration, for the oats to meet the preceding criteria for use in supplement formulations, the oats would need to be processed to increase the protein concentration.

Unlike soy and milk from which protein can be readily extracted and concentration, heretofore it has not been possible to readily extract and concentrate protein from oats. As such, oat protein is not a commercially available ingredient or commodity like soy or milk protein.

SUMMARY OF THE INVENTION

An embodiment of the invention is directed to a method of preparing an oat protein and fiber product. A base formulation is prepared having a major amount of an oat material or waxy barley hybrid. The base formulation is mixed water to form a slurry.

At least one enzyme is mixed into the slurry. The at least one enzyme is capable of facilitating sugar formation and thinning of the slurry. The slurry is cooked to convert the slurry into a first intermediate product having a DE of between about 20 and 90.

The first intermediate product is diluted with water to form a second intermediate product. The second intermediate product is heated. A first solids slurry is recovered from the second intermediate product using a clarifying centrifuge.

The first solids slurry is dried to form a dried product. The dried product has a protein concentration of between about 30 weight percent and about 90 weight percent and a total dietary fiber concentration of less than about 5 weight percent.

Another embodiment of the invention is directed to a method of preparing an oat protein and fiber product. A base formulation is prepared having a major amount of an oat material or waxy barley hybrid. The base formulation is mixed with water to form a slurry.

At least one enzyme is mixed into the slurry. The at least one enzyme is capable of facilitating sugar formation and thinning of the slurry. The slurry is cooked to convert the slurry into a first intermediate product having a DE of between about 20 and 90.

The first intermediate product is diluted with water to form a second intermediate product. The second intermediate product is heated. A first solids slurry is recovered from the second intermediate product using a clarifying centrifuge. At least one enzyme is added to the first solids slurry. The first solids slurry is centrifuged to recover a second solids slurry.

The second solids slurry is dried to form a dried product. The dried product has a protein concentration of between about 30 weight percent and about 90 weight percent and a total dietary fiber concentration of less than about 5 weight percent.

Another embodiment of the invention is directed to an oat protein and fiber product that includes an enzymatically and heat process oat material, wherein the oat material is whole oat flour, low bran oat flour, patent oat flour, partially milled oats, oatmeal and combinations thereof.

The oat protein and fiber product has a protein concentration of between about 30 weight percent and about 90 weight percent and a total dietary fiber concentration of less than about 5 weight percent. The oat protein and fiber product has a moisture content of between about 5 percent and about 10 percent.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 1 is a chart of chemical analysis of several product prepared according to Example 6.

DETAILED DESCRIPTION OF THE PREFERRED EMBODIMENTS

An embodiment of the invention is directed to forming a condensed, high solids syrup with unique sweetening and flavoring characteristics from an oat-based functional syrup. The term functional indicates that the oat-based functional syrup has certain characteristics that make this product useful in fabricating food products and beverages.

As the product thereby produced using the concepts disclosed herein is fabricated from oats, it is perceived as being more valuable than syrups may from other materials such as soy.

The oat-based functional syrup of the invention has several advantages over prior art syrup bases. The oat syrup of the present invention is substantially flavorless. The oat syrup of the present invention may have a nearly white color. Additionally, the oat syrup may exhibit desirable sweetness, texture, and mouthfeel characteristics when formed into food products such as non-dairy frozen confections without exogenous sweeteners, stabilizers, emulsifiers, or proteins, which are commonly used in prior art non-dairy frozen confections.

As used herein, the term "mouthfeel" refers to a creamy sensation that a person experiences in one's mouth upon consuming conventional ice cream. As used herein, the term "exogenous" refers to components that are added to prior art food products and beverages to supplement or modify the characteristics of the prior art food products and beverages.

The properties of the oat-based functional syrup are dictated by the particular oat or grain components selected. It has been found that using a low bran flour, which is substantially reduced in bran while retaining soluble fiber glucans, provides the food products and beverages with desired characteristics.

The term "bran," as used herein, refers to the dark fibrous component found in ground oat flour. The typical compositional analysis of low bran oat flour is similar to whole oat flour for moisture, protein, and fat as illustrated in Table 1, which is set forth below.

TABLE 1

| Composition (weight percent) | Whole Oat Flour | Low Bran Oat Flour | Fine Oat Flour |
|---|---|---|---|
| Moisture | 11 | 11 | 10 |
| Protein | 18 | 15 | 10 |
| Fat | 7 | 7 | 6 |
| Total Dietary Fiber | 9 | 10 | 4-7 |
| Beta-Glucan | 4 | 7 | 2-4 |

While it is also possible to use oats or grains having a significant hull, bran or husk portion to formulate the oat-based functional syrup, syrup formed from these materials may need to be separated from insoluble branny particles present in the oat-based functional syrup before the food product or beverage is produced from the syrup.

As an alternative to using the oats in the form of flour, it is also possible to practice the present invention with other forms of oats, such as rolled oats, partially milled oats, and oatmeal. These various forms of oats are collectively identified as "oat material".

One particular oat flour possessing a low level of bran or hull material is fine oat flour. Fine oat flour is a fraction of the whole oat flour obtained from a sieving or air classification process.

The typical compositional analysis of fine oat flour is similar to whole oat flour for moisture, protein, and fat, as illustrated in Table 1. Fine oat flour also retains a substantial percentage of the soluble fiber that is present in whole oat flour. However, fine oat flour contains less bran or insoluble fiber and more starch than whole oat flour.

The various fractions formed in the oat milling stream produce food products and beverages with varied characteristics. The fractions high in soluble fiber, including whole oat flour and oatmeal, tend to give very smooth and somewhat "dry" texture to soft-serve frozen dessert, while those higher in starch content tend to provide more sweetness.

It will be apparent to those skilled in the art that a desired set of finished product characteristics may be obtained by selecting an appropriate oat starting material or blend of available oat milling fractions. For example, the frozen confection may be formed from a mixture of fine oat flour and whole oat flour. Oat mill products possessing these characteristics can be obtained from various sources including Conagra, Inc. (Council Bluffs, Iowa) or Grain Millers (Minneapolis, Minn.).

It has also been found that a waxy barley hybrid flour also provides advantageous results when used with the present invention. The waxy barley hybrid is a hull-less barley that may be selected from the prowashneupana variety, which can be obtained from Conagra, Inc. (Council Bluff, Iowa). The typical compositional analysis for the prowashneupana waxy barley hybrid is set forth in Table 2.

TABLE 2

| Composition (weight percent) | Waxy Barley Hybrid Flour |
|---|---|
| Moisture | 14 |
| Protein | 20 |
| Fat | 7 |
| Total Dietary Fiber | 29 |
| Beta-Glucan | 14 |

Other starch sources can be used in conjunction with the oat flour or waxy barley hybrid flour to adjust the flavor and sweetness of the food products and/or beverages. While other starch sources may be used in the preparation of the food products and beverages, the other starch sources may only represent a minor portion of oat or grain material (up to 49 weight percent) that is used to prepare the food products and beverages.

The oat flour and the waxy barley hybrid flour comprise a major portion of the oat or grain material (50 weight percent or more) that is used to prepare the oat-based functional syrup. In certain embodiments, the oat flour and the waxy barley hybrid flour comprise between about 50 and about 80 weight percent of the material used to prepare the oat-based functional syrup.

Examples of starch sources that are suitable for use in the present invention include flours, such as corn flour, wheat flour, rice flour, and potato flour. It is believed that the addition of other starch sources to the oat flour or waxy barley hybrid flour does not affect the functional properties of the food products and beverages, such as texture and mouthfeel characteristics.

As a preliminary step in the preparation of the oat-based functional syrup, the oat flour or waxy barley hybrid flour is milled to a fine granulation. Next, the ground material is subjected to a separation technique to remove the larger size particles.

The separation technique may remove substantially all of the ground material that is larger than U.S. #100 mesh. In certain embodiments, the separation technique removes substantially all of the ground material that is larger than U.S. #250 mesh.

Since the bran portion of the oat material typically has a particle size that is greater than this range, a significant portion of the bran portion may be removed from the oat material through the separation technique. In certain embodiments, the separation technique reduces the concentration of the bran component by at least 30 weight percent. In other embodiments, the separation technique reduces the concentration of the bran component by at least 50 weight percent.

The presence of the bran may cause the syrup and subsequent products made from the syrup to be darker in color. Removal of the insoluble fiber results in a lighter colored syrup when cooked by the procedure delineated below. Using an oat material with these characteristics may also enhance the texture of the syrup product.

Additionally, using an oat material with these characteristics may remove the need for a filtration step that was previously required to produce a syrup product with desirable characteristics. This is a major processing advantage since it is far easier to remove and prevent the effects of the bran in the syrup prior to the hydrolysis process. A final filter may be done but it is not a required step, only a quality assurance step.

Separation may be performed with sieve screening or air classification. While both sieve screening and air classification result in very small size material, in certain embodiments sieve screening may result in a higher quality product.

The starch sources are mixed with the oat material to prepare a substantially homogeneous base formulation. A person of ordinary skill in the art will appreciate that the oat material and the starch sources may be mixed together before or after the grinding and separating steps.

A slurry is formed by mixing the base formulation into water in an amount that is effective to provide a solids level of between about 25 percent and about 33 percent on a dry matter basis. In certain embodiments, the water is potable tap water that is provided at a temperature of about 10° C.

Changing the solids level may allow the sweetness of the oat-based functional syrup to be adjusted. For example, increasing the solids level may cause an increase in the starch component, which may increase the sweetness of the oat-based functional syrup.

The cook process may include a one-step procedure. An advantage of the one-step procedure is a reduction of processing time. Surprisingly, this combined enzyme procedure also results in a thinner syrup and a more rapid sugar formation.

An advantage to this cook process is the minimization of browning products normally formed in cook processes containing high reducing sugar. These products are common and form by the well-known Maillard reaction of reducing sugars and protein. When these off-colors are generated, it may be necessary to use reaction processes like activated charcoal to reduce the off-color.

The oat slurry or mixture may be cooked at as low a temperature as possible to minimize flavor defects from bran as well as other components of the oat flour (protein, fat, etc.). In certain embodiments, the cook temperature is between about 60° C. and about 70° C. In other embodiments, the cook temperature is between about 65° C. and 70° C. In still other embodiments, the cook temperature is about 68° C. Using temperatures in excess of this range (i.e., above 70° C.) may result in flavor and color defects.

The heating to the cook temperature may be done relatively slowly over a period of greater than about 15 minutes. In certain embodiments, the heat to the cook temperature may be done over a period of time of between about 30 minutes and about 60 minutes. Heating of this period of time may minimize the development of off flavors.

Using glucoamylase in conjunction with alpha-amylase may result in an improved thinning or liquefying action. The combined use of glucoamylase and alpha-amylase may also produce rapid sugar formation from the oat material. Additional glucoamylase can be added for higher conversion of starch to sugar and a higher sweetness level.

This procedure may result in a higher conversion rate to glucose and a savings in processing time. By decreasing the total thermal exposure of the oat base, the formation of off-flavors from remaining bran and other components in the oat flour may be reduced.

The fine oat flour may be added along with a standard amount of low temperature active alpha-amylase (Genencor SPEZYME LT-75 or Novo BAN) plus an increased amount of glucoamylase that is about twice the conventionally recommended concentration. The enzymes work in conjunction to increase the rate at which glucose is formed.

In certain embodiments, the alpha-amylase may be alpha-1,4-glucan, 4-glucanohydrolase, which is derived from *Bacillus subtilis*. The alpha-amylase may not only produce liquefaction in a random fashion over a broad range of temperatures (between about 65° C. and 92° C.) but also retain its activity when used at temperatures of less than 80° C.

The alpha-amylase may be added to the slurry at a rate of between about 0.50 and 1.25 grams per pound of oat material. In certain embodiments, the alpha-amylase is added at a concentration of about 0.75 grams per pound of oat material. The alpha-amylase may be food grade alpha-amylase, which can be obtained from Genencor International (Rochester, N.Y.) under the designation SPEZYME LT-75.

The dextrin may be converted into glucose using glucoamylase. The glucoamylase is also referred to as fungal 1,4-alpha-D-glucan glucohydrolase, which can be obtained from Genencor International (Rochester, N.Y.) under the designation SPEZYME GA 300.

The glucoamylase may be added to the slurry at a rate of between about 0.50 and 5.0 grams per pound of oat material. In certain embodiments, the glucoamylase is added to the slurry at a rate of about 2.15 grams per pound of oat material.

By increasing the glucoamylase concentration, it may be possible to attain higher glucose levels. Such higher glucose levels may be required for taste in a shorter time and reduce or eliminate off-flavors formed during the longer hold times normally employed for the glucoamylase.

Using the one-step procedure of the present invention may result in a significant reduction in the total processing time, which not only reduces the processing costs but also reduces the off-flavors generated by prolonged exposure of the oat-based functional syrup to increased temperatures.

After the syrup product obtains a desired degree of sweetness, the syrup product may be cooled to a temperature of less than about 30° C. to provide the oat-based functional syrup with a desired conversion level. In certain embodiments, the syrup product may be cooled to a temperature of approximately 10° C.

The syrup product is clean and bland with no off-flavors. If it is desired to increase the fructose concentration in the oat-based functional syrup, the oat-based functional syrup may be subjected to an isomerization step using techniques that are conventionally known in the art.

As noted above, producing an oat-based functional syrup that has a nearly white color enhances the ability to incorporate the oat-based functional syrup into a variety of products. It has been found that subjecting the oat-based functional syrup to clarification lightens the color of the oat-based functional syrup so that the oat-based functional syrup is nearly white.

Depending on the product that is to be made with the oat-based functional syrup, the oat-based functional syrup may be diluted with water to have a consistency (about 14 weight percent solids) that is similar to milk prior to performing clarification. Alternatively, the oat-based functional syrup may be concentrated to have a solids concentration that is greater than about 30 weight percent.

During the clarification step, the oat-based functional syrup may be run through a simple milk clarifier, which is also known as a cream separator. The oat-based functional syrup exiting the milk clarifier is almost white in color.

The extent to which the color of the oat-based functional syrup is lightened may depend upon the residence time of the oat-based functional syrup in the milk clarifier. A longer residence time may result in a paler, weaker colored product that is similar to skim milk.

The length of the clarification process may also depend on the G force used in the clarifier. For example, subjecting the oat-based functional syrup to a G force of about 2,000 G for less than one minute may remove a significant amount of suspended material. Higher G forces (4,500 G) result a paler, lighter colored product. The amount of force imparted in a conventional clarifier may be between 7,000 and 8,500 G.

Product resulting from the clarification step may have an improved color. For example, a white product is easier to color. Some improvement in taste is also apparent, especially in a diluted or milk formula (14 weight percent solids). However, it is been found that extensive clarification of the syrup intended for frozen desserts may remove some of the desired texture qualities—smoothness and mouthfeel—and, therefore, may not be recommended.

The oat-based functional syrup may be used to prepare food products and/or beverages. The oat-based functional syrup may then be flavored as desired using flavoring ingredients that are known in the art such as vanilla or cocoa.

The flavor of the oat-based functional syrup may be enhanced by the addition of a small concentration of a flavor enhancer. Various flavor enhancers are known in the art and are selected based upon the particular flavoring ingredients that are used in the food products and/or beverages.

It is also possible to enhance the flavor of the food products and/or beverages made from the oat-based functional syrup by adding salt in a concentration of up to 1 weight percent. In certain embodiments, the salt is provided at a concentration of about 0.35 weight percent of the oat-based functional syrup.

Adding salt to the oat-based functional syrup after the oat-based functional syrup is formed may minimize off-flavors resulting from the addition of the salt while the oat-based functional syrup is being prepared.

After the above basic conversion steps are performed and the desired conversion level (low DE equivalent to about 20 or high DE equivalent to about 60) or sweetness level, the slurry may be run through a separator to remove any coarse solids while leaving other components that are more soluble such a protein, some fiber and fat (naturally emulsified). In certain embodiments, the separator is a decanter.

The decantant material may be transferred by pumping to an evaporator system. The evaporator system may have a variety of configurations, examples of which include single effect, double effect and triple effect.

To allow holding the decantant material in a surge vessel prior to evaporation, the decantant material can be pasteurized. An example of one such suitable pasteurization technique includes high temperature short time (HTST) pasteurization.

The solids content of the oat-based functional syrup may be increased by reducing the moisture content of the product. An example of one suitable technique that may be used to reduce the moisture content is evaporation. In certain embodiments, the evaporation may be performed at a temperature of about 50° C. and a vacuum of about 70 centimeters of mercury.

In some applications it may be desirable to use a syrup with a lower sugar level to primarily function in food formulations to bind ingredients with the syrup such as in food bars. In such situations, the syrup may be between about 25 and 50 percent as sweet as a fully converted syrup. In a fully converted syrup, substantially all the starch has been enzymatically converted to sugars. The syrup industry also uses the reducing sugar content divided by total solid as an expression of DE.

These lower sweetness syrups are commonly referred to in the industry as low dextrose equivalent ("DE") syrups. The dextrose equivalent is the percent solids measured as dextrose divided by the total starch solids. The syrup industry also uses the reducing sugar content divided by total solid as an expression of DE.

Syrups with a DE of 42 are most common but higher (DE 60) and lower (DE 26) are used for specific applications as well. Low DE syrups represent partial conversion to lower levels of sugars as glucose or maltose.

A slurry is formed by mixing oat flour with water to provide a relatively low solids. In certain embodiments, the slurry has an oat flour concentration of about 15 weight percent. This lower solids formulation is converted as is discussed in U.S. Pat. No. 6,685,974.

The converted mixture is decanted as discussed above and then subjected to mechanical separation. In certain embodiments, the mechanical separation is done using a centrifuge. An example of one such centrifuge that may be used in conjunction with the mechanical separation is a stacked disk centrifuge, which is commercially available from a variety of companies such as Alfa Laval. The mechanical separation process enables finer material to be removed from the decantant. The clarified decantant thereby is more similar to conventional corn syrup.

The lower solids concentration of about 15 weight percent (or in certain embodiments about 12 weight percent) results in a much less viscous slurry and conversion syrup than higher solids formulations which significantly increases the ability of the centrifuge to remove solids and result in a higher clarified product. The clarified product is also less turbid.

The slurry having a solids concentration of about 15 weight percent is converted to, for example, 4.2 weight percent glucose, the enzyme reaction largely stopped by cooling the slurry to less than about 27° C. The cooled slurry is then centrifuged using the decanter to remove the coarser or heavier suspended material.

The viscosity of the decantant is further reduced and all enzyme activity stopped by heating it to a temperature of greater than 82° C. In certain embodiments, the decantant is heated to a temperature of between about 82° C. and about 96° C. Next, the decantant is transferred to a stacked disk centrifuge and metered such as to further remove suspended or colloidal material. This process resulted in a clarified light syrup.

Alternatively, the final clarified light syrup is then heat treated per HTST (high temperature short time pasteurization) or similar treatments so as to 'kill' the enzyme activity by exceeding 82° C. and holding at such temperature for the kill to be substantially effective. In certain embodiments, the hold time was up to about 5 minutes. This process also serves to pasteurize the product. A longer hold time or exposure to heat can be done at this stage of the process without deleterious effects. The glucose content changed slightly to about 5.2 weight percent.

The syrup is then condensed to 50 Brix and caramelized as below or, alternatively, simply condensed without the caramelization step to a solids concentration of at least about 80 weight percent for a low water activity, microbially stable product. In certain embodiments, the final product has a DE of about 42. Lower DE syrups are simply cooled to stop sugar formation sooner to result in a lower sugar content.

Dilute slurry syrups can also be made using the process described above but starting at a higher solids (such as about 28 weight percent). Next, the slurry is converted using the process described in Whalen et al., U.S. Pat. No. 6,685,974. Thereafter, the product may be diluted to decrease the solids concentration (such as by the addition of water at a ratio of about 1:1) prior to the centrifuge steps to make the clarified syrup product. It has been found that this is a more efficient way to make the initial conversion syrup.

Upon achieving a Brix reading of about 50, the vacuum is removed and the oat-based functional syrup may be heated to a temperature of about to 82° C. Such a process has been found to produce caramelization of the oat-based functional syrup.

It has been found that the oat-based functional syrup will continue to lose virtually all 'oaty' or 'grainy' type flavors as the oat-based functional syrup is condensed. Upon continued evaporation and increasing the temperature, the oat-based functional syrup will develop distinct maple then caramel flavors.

In certain embodiments, the final condensed oat-based functional syrup has a concentration of between about 65 and 72 Brix. The Brix and solids level can continue to be increased to higher levels if desired such as to attain a solids concentration of between about 78 and 82 weight percent.

It has been discovered that holding the syrup at higher temperatures starting at 50 Brix, the oat-based functional syrup will develop strong caramel flavors as well as the appearance of caramel candy (caramel color). This is accomplished by holding the 50 Brix syrup at a product temperature of between about 82° C. and 93° C. without vacuum, for between about 15 and 20 minutes in a batch or single effect evaporator.

The oat-based functional syrup will develop the desired caramel flavor and color. The intensity of the color is affected by how long the syrup is held at this higher temperature. After the caramelization step, the temperature is reduced to between about 49° C. and 54° C. and the vacuum resumed at up to about 69 centimeters Hg.

The oat-based functional syrup will then quickly attain a solids level of 65 to 77 Brix (whatever is desired). In a double effect evaporator, the solids and flavor will be developed in the first evaporator and finished in the second evaporator to the desire solids level.

Another embodiment of the invention is directed to preparing an oat protein and fiber product. As an initial step in preparing this product, an oat-based initial syrup was produced using a process that is similar to the process set forth in Whalen et al., U.S. Pat. No. 6,685,974. In this syrup, the starch was substantially converted to glucose, which provided the syrup with a glucose concentration of about 18 weight percent.

Next, the syrup is diluted with water to form a mixture. In certain embodiment, the ratio of water to syrup is between about 3:1 to about 1:3. In other embodiments, the ratio of water to syrup is about 1:1.

The mixture is centrifuged. In certain embodiments, the centrifuge is a decanting centrifuge such as a Penwalt P660. The resulting decanter solids have a protein concentration of between about 15 weight percent and about 30 weight percent on a dry weight basis. In other embodiments, the decenter solids have a protein concentration of about 20 weight percent protein on a dry weight basis.

The decanter solids have a total dietary fiber concentration of between about 10 weight percent and about 30 weight percent. In other embodiments, the total dietary fiber concentration of the decanter solids is between about 16 weight percent and about 20 weight percent.

The mixture is heated to a temperature is greater than about 65° C. In other embodiments, the temperature is between about 71° C. and about 82° C. The decantant liquid is then clarified. An example of one suitable device that may be used for clarification is a clarifying centrifuge such as a stacked disc de-sludging centrifuge (Westfalia SB 7). The clarifying centrifuge may have a timed hydraulic purge to clean the centrifuge bowl. The resulting material was a high solids slurry.

The high solids slurry is then dried. An example of one suitable drying technique is spray drying. The spray dried product has a protein concentration of between about 40 and 50 weight percent on a dry basis. The spray dried product has a total dietary fiber content of less than about 3 weight percent. This total dietary fiber concentration is much lower than the fiber content of the decanter solids. The remainder of the spray dried product is carbohydrate as starch or sugar.

Based upon the preceding results, it is believed that the decanter functions to remove the fibrous material from the oat conversion syrup. Both the decanter solids and the clarifying centrifuge solids contained between about 16 and 20 weight percent oat lipid (oat oil).

Sweetener syrups used for food formulations are commonly only partially converted. The degree of conversion is expressed as the DE. DE is equal to the amount of reducing sugars as glucose divided by the total reducing sugar as starch and dextrins and converted to percent.

A widely used syrup has a DE of about 42, wherein about one-half of the syrup is primarily glucose and maltose. The lower the DE, the lower the sugar content and sweetness level. Lower DE syrups are valued for their binding qualities in such products as cereal bars.

Unlike the conversion discussed above, these lower conversion syrups contain dextrins and starch that can be separated out with the other solids by the clarifying centrifuge. Such a process substantially dilutes the protein content. In certain embodiments, the protein content is reduced by about one half. This process results in a dried product containing an oat protein concentration of only between about 20 weight percent and about 25 weight percent.

To circumvent this problem, a second conversion is performed on the solids slurry obtained from the clarifying centrifuge to convert the remaining starch and dextrins to dextrose. Solids from the clarifying centrifuge are collected at up to a level of about 25 weight percent of the total syrup being centrifuged.

Alpha-amylase is added to the slurry. In certain embodiments, the alpha-amylase is added at a concentration of between about 0.05 weight percent and about 0.20 weight percent. In other embodiments, the alpha-amylase is added at a concentration of between about 0.07 weight percent and about 0.14 weight percent.

The mixture is heated to solubilize any residual starch. In certain embodiments, the temperature is greater than about 65° C. In other embodiments, the temperature is between about 71° C. and about 82° C.

The mixture is maintained at this temperature for a sufficiently long period of time to solubilize the residual starch. In certain embodiments, the mixture is maintained at the temperature for more than about 15 minutes. In other embodiments, the mixture is maintained at the temperature for about 30 minutes. The mixture is then cooled to a temperature of less than about 65° C. In certain embodiments, the mixture is cooled to a temperature of about 60° C.

Glucoamylase is added to the mixture. In certain embodiments, the glucoamylase is added at a concentration of between about 0.05 weight percent and about 0.20 weight percent. In other embodiments, the glucoamylase is added at a concentration of between about 0.07 weight percent and about 0.14 weight percent.

Mixing is continued until the mixture is substantially homogeneous. The mixture is held at this temperature until the glucose level is stable. A factor in the length of the hold time may be the concentration of glucoamylase that is used. In certain embodiments, the hold time is between about 30 and 120 minutes.

The secondary converted material is then centrifuged. In certain embodiments, the centrifuge is a clarifying centrifuge. Since the starch and dextrins have been converted to soluble glucose, these components may remain with the liquid instead of separating out with the clarifying centrifuge solids.

The protein content is not diluted and achieves a level of at least about 40 percent on a dry weight basis. The centrate containing the glucose is returned to the process by (1) adding it back to the initial conversion as make-up water or, (2) returned as dilution water to the initial syrup for decanting. In this manner none of the sugar is lost in the process.

The protein concentration of the product can be increase by performing a wash. The wash can be done by diluting the sludge from the clarifying centrifuge with water and re-centrifuging.

As long as the carbohydrate in the sludge is soluble sugar, it will be removed with the liquid and not separate as a solid. The protein content will increase as these diluting soluble components are reduced.

The product and method of the present invention are described in the following examples. These examples are provided as an illustration of the invention and are not intended to limit the invention.

Example 1

A single effect, batch evaporator was fed a centrifuged decantant oat-based functional syrup with a solids level of about 25 weight percent and a glucose level of between about 16 and 18 weight percent (or a DE of about 60) to a level in the evaporator which covered the heating elements at the bottom of the evaporator. In certain embodiments, the evaporator's working volume was approximately 38 liters.

The low solids oat-based functional syrup was gradually fed into the evaporator as water was evaporated at 49° C. with a pressure of between about 51 and 69 centimeters Hg vacuum until the batch evaporator reached the working volume.

When the solids content achieved 51 Brix, the vacuum was shut off and the product temperature was increase to between about 80° C. and 88° C. The product thereafter changed from a strong cereal off-flavor to a bland flavor and continued to produce maple and caramel flavors with a simultaneous change in color from the original tan to a caramel color.

Stronger caramel flavor was produced by continuing the conditions for about 20 minutes until a strong caramel flavor devoid of burned notes was produced. The temperature was then reduced to about 54° C. and the vacuum resumed at about 69 centimeters Hg at which the solids level rapidly achieved 70 Brix.

A similar result was obtained using a double effect evaporator operated with continuous feed wherein the base syrup was pre-heated to about 88° C., operated until the Brix level was about 50 and then finished in the second evaporator at about 60° C. and a vacuum of about 51 centimeters Hg.

Example 2

Clarified Syrup Product

A syrup product was produced as in Example 1 except the syrup base material was subjected to higher centrifugal force using a stacked disk separator (Alfa Laval) to reduce suspended solids by about 50 percent more than that in Example 1. This material was then fed to a single effect batch evaporator to a level which covered the heating elements at the bottom of the evaporator. The evaporator's working volume was about 38 liters.

The product was evaporated as in Example 1. The condensed syrup resulting from the higher centrifugal force treatment of the base material had greater sweetness impact as evaluated by tasting the product and more intense caramel flavor than the product made per Example 1.

Example 3

Lower Conversion Syrup

A syrup product was prepared using the process described in U.S. Pat. No. 6,685,974. The oat flour comprised 25 percent of the slurry on a weight to weight basis. The slurry was treated per the conversion process described in U.S. Pat. No. 6,685,974 to approximately one-half the sugar content of Example 1.

The sugar level was about 9 percent on a weight to weight basis as glucose and had a DE of between about 25 and 30. The reaction is stopped by chilling the slurry to a temperature of between about 4° C. and 27° C. The cooled slurry was then centrifuged using the process set forth in Example 1.

Next, the centrate or liquid portion was heat-treated at a temperature of at least about 82° C. using processes common in the industry such as plate and frame heat exchangers. In this manner, the sugar producing reaction was halted and lower DE maintained.

The centrate was then condensed using a process that was similar to the process set forth in Example 1 to produce a syrup with much lower sweetness and sugar content but having good binding properties for making products such as food bars.

Example 4

High Clarified, Lower Conversion Syrup

A syrup product was prepared using the process described in Whalen et al., U.S. Pat. No. 6,685,974. The oat flour comprised 15 percent of the slurry on a weight to weight basis. The slurry was treated using the conversion process discussed in Whalen et al., U.S. Pat. No. 6,685,974, to approximately one-half the sugar content of Example 1.

The sugar level was about 4.2 percent on a weight to weight basis as glucose and had a DE of between about 25 and 30. The reaction was stopped by chilling the slurry to a temperature of between about 4° C. and 27° C. The cooled slurry was then centrifuged using the process set forth in Example 1.

Next, the centrate or liquid portion was heat-treated at a temperature of at least about 82° C. using processes common in the industry such as plate and frame heat exchangers. In this manner, the sugar producing reaction was halted and lower DE maintained.

The centrate was then condensed using a process that was similar to the process set forth in Example 1 to produce a syrup with much lower sweetness and sugar content but having good binding properties for making products such as food bars.

Example 5

High Maltose Syrup

A base syrup slurry with a solids level of 25 percent on a weight to weight basis was produced using a process that is similar to the process set forth in Whalen et al., U.S. Pat. No. 6,685,974, except that fungal alpha-amylase was used instead of bacterial alpha-amylase.

After conversion using the process set forth in Whalen et al., U.S. Pat. No. 6,685,974, the sugar content of the slurry was approximately 40 weight percent maltose and 60 weight percent glucose. Next, the slurry was centrifuged and evaporated using the method set forth in Example 1.

The syrup product maintained the ratio of maltose to glucose and, as a result, was less sweet since maltose is about 10 percent less sweet than glucose. This type of syrup is desirable by food formulators who wish to lessen the sweetness impact of their product while retaining the high conversion syrup properties.

Example 6

High Conversion Syrup

An oat-based initial syrup was produced using a process that is similar to the process set forth in Whalen et al., U.S. Pat. No. 6,685,974, wherein the starch is substantially converted to glucose (approximately 18 weight percent glucose).

A slurry if formed by mixing an oat material and water. At least one enzyme is mixed into the slurry. The at least one enzyme is capable of facilitating sugar formation and thinning of the slurry. The slurry is cooked to convert the slurry into a first intermediate product having a DE of between about 20 and about 90.

The first intermediate is diluted with water at a ratio of about 1:1 to form a second intermediate product. The second intermediate product was heated to a temperature of about 70° C.

The second intermediate product was then clarified using a clarifying centrifuge such as a stacked disc de-sludging centrifuge. A Westfalia SB 7 de-sludging/clarifying centrifuge was used with a timed hydraulic purge to clean the centrifuge bowl. The resulting material was a high solids slurry.

This high solids slurry was dried by spray drying. The spray dried product had a moisture content of between about 5 percent and about 10 percent, a protein content of between about 40 and 60 weight percent on a dry basis and a total dietary fiber concentration of between about 2 and 4 weight percent, which is much lower than the fiber content of the decanter solids. The remainder of the materials in the spray dried product is carbohydrate as starch or sugar.

Example 7

High Conversion Syrup

An oat-based initial syrup was produced using a process that is similar to the process set forth in Whalen et al., U.S. Pat. No. 6,685,974, wherein the starch is substantially converted to glucose (approximately 18 weight percent glucose).

At least one enzyme is mixed into the slurry. The at least one enzyme is capable of facilitating sugar formation and thinning of the slurry. The slurry is cooked to convert the slurry into a first intermediate product having a DE of between about 20 and about 90.

The first intermediate is diluted with water at a ratio of about 1:1 and centrifuged using a decanting centrifuge (Penwalt P660). The resulting decanter solids have a protein concentration of about 20 weight percent on a dry weight basis and a total dietary fiber concentration of between about 16 weight percent and about 20 weight percent.

The decantant liquid is then clarified using a clarifying centrifuge such as a stacked disc de-sludging centrifuge. A Westfalia SB 7 de-sludging/clarifying centrifuge was used with a timed hydraulic purge to clean the centrifuge bowl. The resulting material was a high solids slurry.

This high solids slurry was dried by spray drying. The spray dried product had a protein content of between about 40 and 50 weight percent on a dry basis and total dietary fiber concentration of between about 2 and 3 weight percent, which is much lower than the fiber content of the decanter solids. The compositions of the components in the spray dried product are set forth in Table 3 below. The remainder of the materials in the spray dried product is carbohydrate as starch or sugar.

TABLE 3

| Composition (weight percent) | Decanter Solids | Clarifier Centrifuge |
|---|---|---|
| Protein | 38.1 | 46 |
| Lipid | 20 | 14.2 |
| Fiber | 18 | 1.2 |
| Ash | 4.5 | 0.86 |

Based upon the preceding results, it is believed that the decanter functions to remove the fibrous material from the oat conversion syrup. Both the decanter solids and the clarifying centrifuge solids contained between about 16 and 20 weight percent oat lipid (oat oil).

Example 8

Lower Conversion Syrup

A second conversion was performed on the solids slurry obtained from the clarifying centrifuge in Example 6 to convert the remaining starch and dextrins to dextrose. Solids from the clarifying centrifuge are collected at a level of about 25 weight percent of the total syrup being centrifuged.

Alpha-amylase was added at a concentration of between about 0.07 and 0.14 weight percent. The mixture was heated to a temperature of between about 71° C. and 82° C. for approximately 30 minutes to solubilize any residual starch. Thereafter, the mixture was cooled to a temperature of about 60° C.

Glucoamylase was added to the mixture at a concentration of between about 0.07 and 0.14 weight percent. After being mixed until substantially homogeneous, the mixture was held until the glucose level was stable. A factor in the length of the hold time may be the concentration of glucoamylase used. In certain embodiments, the hold time is between about 30 and 120 minutes.

The secondary converted material was then centrifuged by passing through a clarifying centrifuge. Since the starch and dextrins have been converted to soluble glucose, these components may remain with the liquid instead of separating out with the clarifying centrifuge solids.

The protein content was not diluted and achieved a level of at least about 40 percent on a dry weight basis. The centrate containing the glucose was returned to the process by (1) adding it back to the initial conversion as make-up water or, (2) returned as dilution water to the initial syrup for decanting. In this manner none of the sugar is lost in the process. See Tables 3 and 4. The remainder of the material is carbohydrate or sugars.

TABLE 4

| Composition (weight percent) | Decanter Solids | Clarifier Centrifuge without second conversion | Clarifier Centrifuge with second conversion |
|---|---|---|---|
| Protein | 38.1 | 24 | 44.2 |
| Lipid | 20 | 11.4 | 16.5 |
| Fiber | 18 | 1.8 | 2.28 |
| Ash | 4.5 | 0.84 | 1.36 |

Example 9

Amino Acid Profile

Another benefit of the oat protein and fiber product produced according to the methods described herein is that the oat protein and fiber product includes advantageous levels of several amino acids that are beneficial for consumption by humans.

FIG. 1 includes a chart that provides the amino acid profiles of several oat protein and fiber products produced according to Example 6. In addition to providing the amino acid levels that were measured, this chart also includes the amino acid levels converted to a 100 gram protein sample, which is similar to the manner in which amino acid levels are conventionally reported. FIG. 1 also includes the levels of various sugars, fat, ash, protein, moisture and total dietary fiber (TDF) for the samples.

While the chart indicates that several of the amino acids have relatively high concentrations, an even more important indication from the chart is that the oat protein and fiber product has a balanced amino acid profile. This means that each of the amino acids included in this chart are present at more than trivial levels. This amino acid profile is quite different and superior to the amino acid profile of other high protein ingredients that are typically used in food products.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A method of preparing an oat protein and fiber product comprising:
    preparing a base composition comprising an oat material;
    mixing the base composition and water to form a slurry;
    mixing at least one enzyme into the slurry, wherein the at least one enzyme facilitates sugar formation and thinning of the slurry;
    cooking the slurry to convert the slurry into a first intermediate product having a dextrose equivalent (DE) of between about 20 and 90;
    diluting the first intermediate product with water to form a second intermediate product;
    recovering a decanting centrifuge solids slurry from the second intermediate product by passing the second intermediate product through a decanting centrifuge, wherein the decanting centrifuge solids slurry has a protein concentration of between about 15 and 30 weight percent on a dry weight basis and a total dietary fiber concentration of between about 10 and 30 weight percent;
    heating the decanting centrifuge solids slurry;
    recovering a clarifying centrifuge solids slurry from the heated decanting centrifuge solids using a clarifying centrifuge;

washing the clarifying centrifuge solids slurry to increase a protein concentration thereof and produce a washed clarifying centrifuge solids slurry; and drying the washed clarifying centrifuge solids slurry to form a dried product, wherein the dried product has a protein concentration of between about 30 weight percent and about 90 weight percent and a total dietary fiber concentration of less than about 5 weight percent.

2. The method of claim 1, wherein the oat material comprises whole oat flour, low bran oat flour, patent oat flour, partially milled oats, oatmeal or combinations thereof.

3. The method of claim 1, wherein the at least one enzyme comprises alpha-amylase or glucoamylase.

4. The method of claim 1, wherein the water is mixed with the first intermediate product at a ratio of about 1:1.

5. The method of claim 1, wherein the decanting centrifuge solids slurry is heated to a temperature of between about 71° C. and about 82° C.

6. The method of claim 1, wherein the drying comprises spray drying.

7. The method of claim 1, wherein the dried product has a protein concentration of between about 50 weight percent and about 60 weight percent.

8. The method of claim 1, wherein the dried product has a moisture content of between about 5 percent and about 10 percent.

9. A method of preparing an oat protein and fiber product comprising:

preparing a base composition comprising an oat material;

mixing the base composition and water to form a slurry;

mixing at least one enzyme into the slurry, wherein the at least one enzyme facilitates sugar formation and thinning of the slurry;

cooking the slurry to convert the slurry into a first intermediate product having a dextrose equivalent (DE) of between about 20 and 90;

diluting the first intermediate product with water to form a second intermediate product;

recovering a decanting centrifuge solids slurry from the second intermediate product by passing the second intermediate product through a decanting centrifuge, wherein the decanting centrifuge solids slurry has a protein concentration of between about 15 and 30 weight percent on a dry weight basis and a total dietary fiber concentration of between about 10 and 30 weight percent;

heating the decanting centrifuge solids slurry;

recovering a clarifying centrifuge solids slurry from the heated decanting centrifuge solids slurry using a clarifying centrifuge;

adding at least one enzyme to clarifying centrifuge solids slurry;

centrifuging the clarifying centrifuge solids slurry to recover a third solids slurry;

washing the third solids slurry to increase a protein concentration thereof and produce a washed third solids slurry; and drying the washed third solids slurry to form a dried product, wherein the dried product has a protein concentration of between about 30 weight percent and about 90 weight percent and a total dietary fiber concentration of less than about 5 weight percent.

10. The method of claim 9, wherein adding the at least one enzyme to the decanting centrifuge solids slurry comprises:

adding alpha-amylase to the decanting centrifuge solids slurry when the decanting centrifuge solids slurry is at a first temperature, wherein the alpha-amylase is added at a concentration of between about 0.07 weight percent and about 0.14 weight percent; and adding glucoamylase to the decanting centrifuge solids slurry when the decanting centrifuge solids slurry is at a second temperature, wherein the glucoamylase is added at a concentration of between about 0.07 weight percent and about 0.14 weight percent and wherein the first temperature is higher than the second temperature.

11. The method of claim 10, wherein the mixture is maintained at the second temperature until a concentration of glucose remains substantially constant.

12. The method of claim 9, wherein the oat material comprises whole oat flour, low bran oat flour, patent oat flour, partially milled oats, oatmeal or combinations thereof.

13. The method of claim 9, wherein the at least one enzyme added to the slurry comprises alpha-amylase or glucoamylase.

14. The method of claim 9, wherein the water is mixed with the first intermediate product at a ratio of about 1:1.

15. The method of claim 9, wherein the decanting centrifuge solids slurry is heated to a temperature of between about 71° C. and about 82° C.

16. The method of claim 9, wherein the drying comprises spray drying and wherein the dried product has a moisture content of between about 5 percent and about 10 percent.

17. The method of claim 9, wherein the dried product has a protein concentration of between about 50 weight percent and about 60 weight percent.

* * * * *